US012777217B2

(12) United States Patent
Hossain et al.

(10) Patent No.: US 12,777,217 B2
(45) Date of Patent: Oct. 27, 2026

(54) SYSTEMS AND METHODS TO DEFINE A CREATIVE ASSET FOR PRESENTATION WITH STREAMING VIDEO CONTENT THROUGH DIFFERENT VERSIONS OF A STREAMING VIDEO PLAYER APPLICATION

(71) Applicant: Disney Enterprises, Inc., Burbank, CA (US)

(72) Inventors: Yasir Hossain, Burbank, CA (US); Daniel Bostonweeks, Burbank, CA (US); Jens Loeffler, Burbank, CA (US); Christopher France, Burbank, CA (US); William F. West, Burbank, CA (US); Kristoffer Walker, Burbank, CA (US); Vanik Gevorgyan, Burbank, CA (US); Pratik Prajapati, Burbank, CA (US); Michael Luttrell, Burbank, CA (US); Timothy Greenfield, Burbank, CA (US); Aaron LaBerge, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 24 days.

(21) Appl. No.: 19/013,882

(22) Filed: Jan. 8, 2025

(65) Prior Publication Data

US 2025/0227322 A1 Jul. 10, 2025

Related U.S. Application Data

(60) Provisional application No. 63/619,258, filed on Jan. 9, 2024.

(51) Int. Cl.
*H04N 21/431* (2011.01)
*G06F 9/451* (2018.01)
*H04N 21/2387* (2011.01)

(52) U.S. Cl.
CPC .......... *H04N 21/431* (2013.01); *G06F 9/451* (2018.02); *H04N 21/2387* (2013.01)

(58) Field of Classification Search
CPC ... H04N 21/431; H04N 21/2387; G06F 9/451
See application file for complete search history.

(56) References Cited

U.S. PATENT DOCUMENTS

2013/0126200 A1* 5/2013 Lu .......................... B23D 51/18 173/169

* cited by examiner

*Primary Examiner* — Girumsew Wendmagegn
(74) *Attorney, Agent, or Firm* — Esplin & Associates, PC

(57) ABSTRACT

Systems and method to generate creative asset files for rendering creative assets with streaming video content through different versions of a streaming video player application. Exemplary implementations may: receive an arrangement of items of content for a creative asset, determine a creative asset specification that conveys the arrangement of the items of content, analyze the creative asset specification to verify that the creative asset specification is compliant with a player-compliant schema for encoding media, generate a creative asset file that facilitates rendering of the creative asset by the different versions of the streaming video player application for presentation with streaming video, generate multiple renderings of the creative asset from the creative asset file that reflect expected renderings to be generated by the different versions of the streaming video player application, effectuate presentation of the multiple renderings through the design user interface, or other exemplary implementations.

20 Claims, 11 Drawing Sheets

SYSTEMS AND METHODS TO DEFINE A CREATIVE ASSET FOR PRESENTATION WITH STREAMING VIDEO CONTENT THROUGH DIFFERENT VERSIONS OF A STREAMING VIDEO PLAYER APPLICATION

CROSS-REFERENCE TO RELATED APPLICATION

This application claims priority benefit of the U.S. Provisional Patent Application No. 63/619,258 titled, "SYSTEMS AND METHODS TO DEFINE A CREATIVE ASSET FOR PRESENTATION WITH STREAMING VIDEO CONTENT THROUGH DIFFERENT VERSIONS OF A STREAMING VIDEO PLATER APPLICATION," filed on Jan. 9, 2024. The subject matter of this related application is hereby incorporated herein by reference.

FIELD OF THE DISCLOSURE

The present disclosure relates to systems and methods to define a creative asset for presentation with streaming video content through different versions of a streaming video player application, in accordance with one or more implementations.

BACKGROUND

Existing methods of inserting content into streams of video fail to facilitate dynamic, scalable, and seamless integration across different devices and streaming applications. Different applications may employ different methods for inserting content and support content with differing configurations. Such deficiencies may require developers to customize content insertion for individual devices or applications. This may impede consistency, detract from the user's experience, and consume resources.

DETAILED DESCRIPTION

Figure 1:
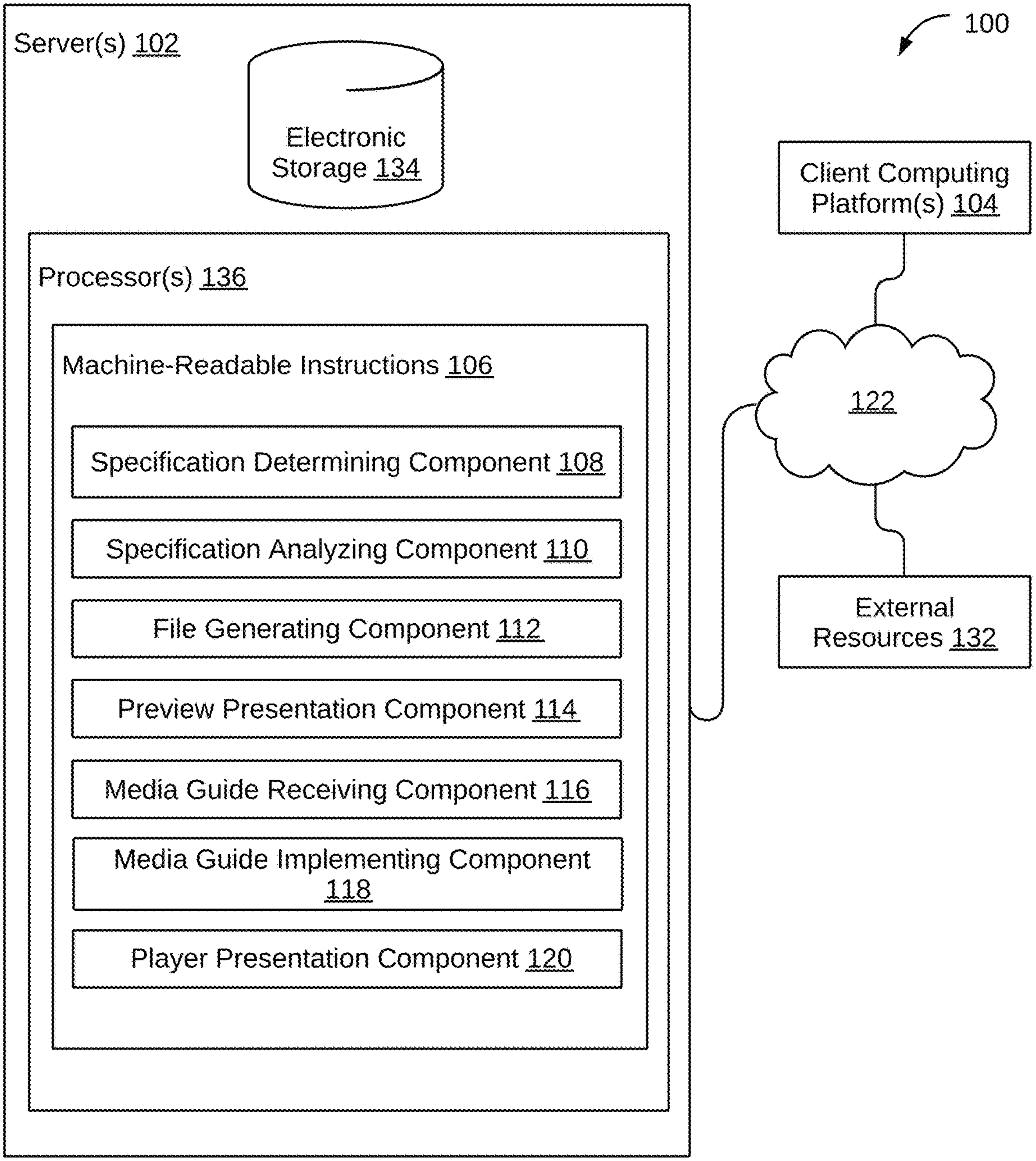
FIG. 1 illustrates a system to generate creative asset files for rendering creative assets with streaming video content through different versions of a streaming video player application, in accordance with one or more implementations.

FIG. 1 illustrates a system 100 configured to encode media into player-compliant files for presentation with streaming video content through different versions of a streaming video player application, define a creative asset that includes the media in accordance with a player-compliant schema, and render the creative asset for presentation during the streaming of video content, in accordance with one or more implementations. In some implementations, system 100 may include one or more servers 102. Server(s) 102 may be configured to communicate with one or more client computing platforms 104 according to a client/server architecture or other architectures. Client computing platform(s) 104 may be configured to communicate with other client computing platforms via server(s) 102 or according to a peer-to-peer architecture or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of specification determining component 108, specification analyzing component 110, file generating component 112, preview presentation component 114, media guide receiving component 116, media guide implementing component 118, player presentation component 120, and other instruction components.

Specification determining component 108 may be configured to receive, from a user via a design user interface, an arrangement of items of content for a creative asset. The creative asset may be media for presentation with streaming video content. Media may refer to one or more images, videos, audio, olfactory content, haptics, or other media itself that consumers may view or experience. Individual ones of the media may be an item of content. The arrangement of the items of content may refer to a layout of the items that the consumers view or experience via a display device, one or more user interfaces, or other components. In some implementations, the arrangement may be defined by selecting a template and specifying the items within the template. The display device may be a television screen, a computer monitor, a tablet screen, a smartphone screen, a laptop screen, or other display device that the consumers may at least view visual content. The user interfaces may include one or more physical buttons, joysticks, touchscreens, scroll wheels, or other user interface elements that enable the consumers to provide information or selections.

Presentation of the media with streaming video may refer to presentation of the media in conjunction with the streaming video which may include one or more of the media overlaid the streaming video, split screen with the streaming video, inserted before the streaming video, inserted after the streaming video, inserted within the streaming video, and other presentation. The media overlaid the streaming video may be in a corner of the streaming video, adjacent to an edge of the streaming video, in the middle of the streaming video, or other positioning over the streaming video. The spilt screen may be horizontally split, vertically split, or diagonally split. The media and the streaming video on the split screen may be equal proportions (e.g., the media is presented on half of a display and the streaming video is presented on half of the display) or unequal proportions (e.g., 25%-75%, 30%-70%). The media inserted within the streaming video may be at a particular point within a duration of the streaming video such that the streaming video is paused or modified in another manner.

Figure 5A:
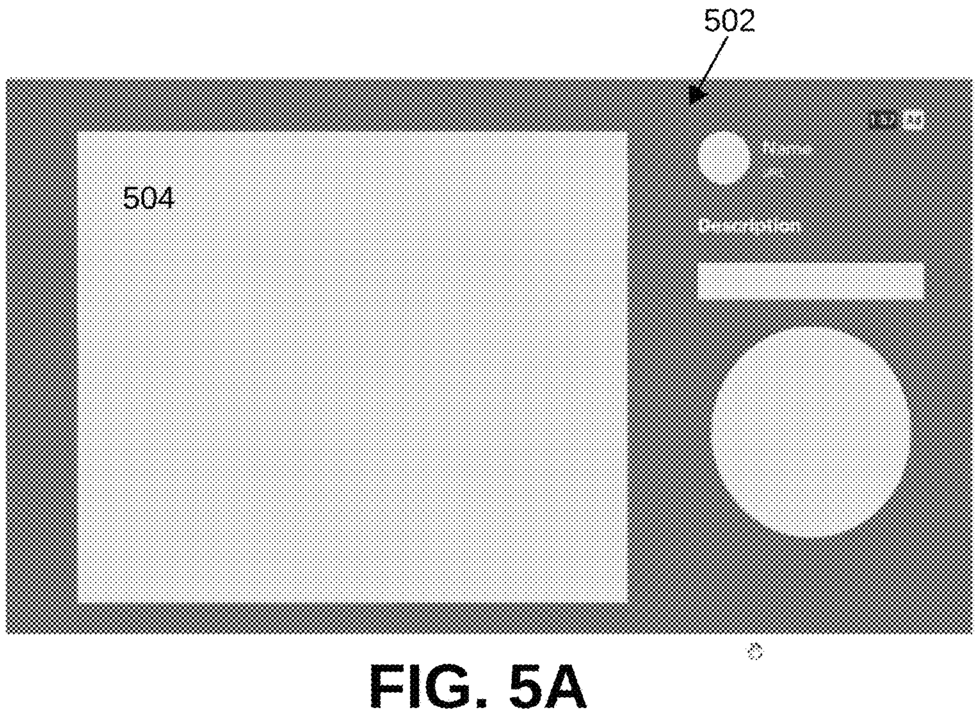
FIGS. 5A-C illustrate an exemplary creative asset, in accordance with one or more implementations.
Figure 5B:
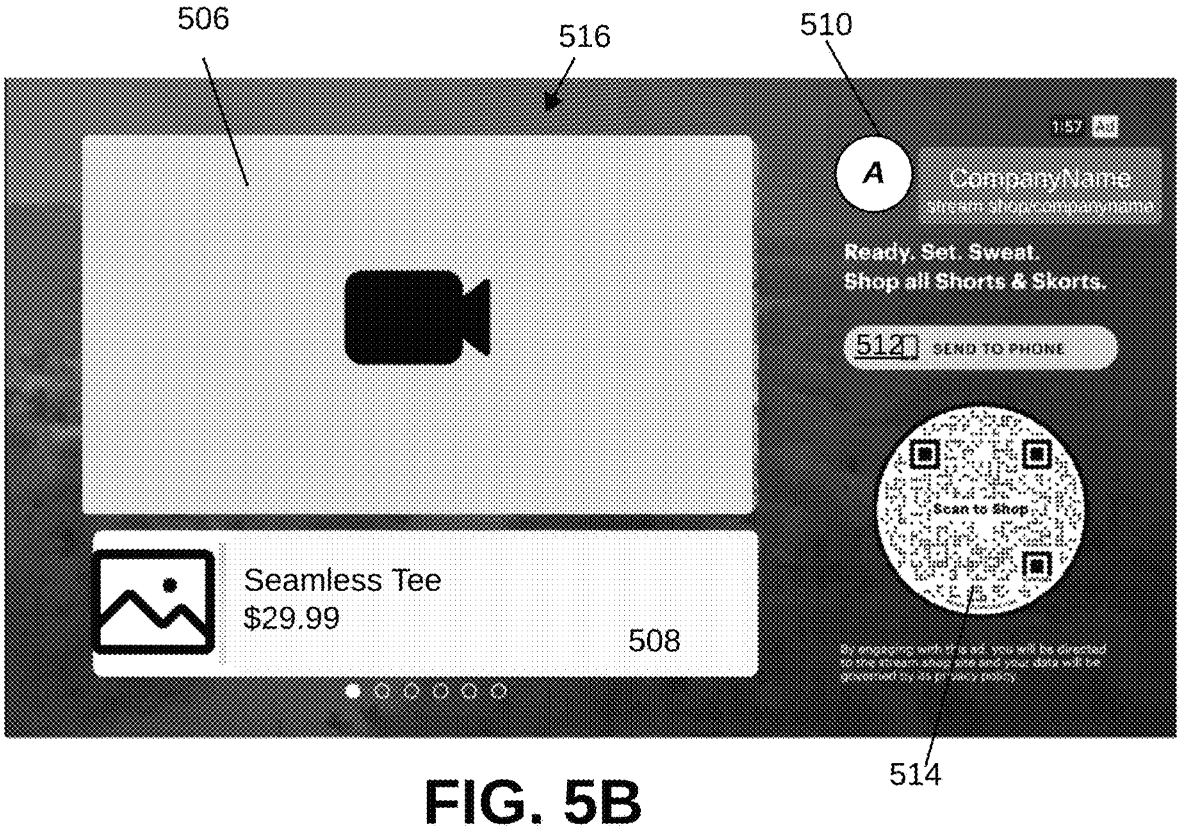
Figure 5C:
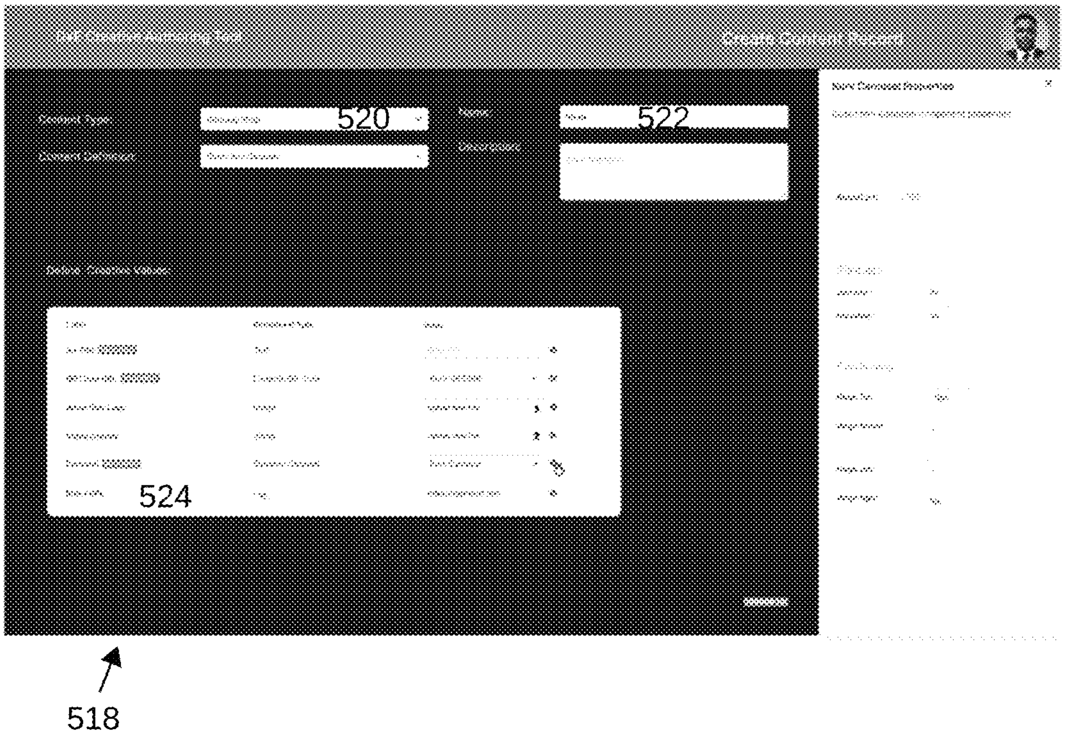

FIG. 5A illustrates a template 502 for creative assets. Template 502 may include at least a container 504 of which one or more items of content may be arranged in. FIG. 5B illustrates an arrangement 516 of items in accordance with template 502. Arrangement 520 includes video 506 and carousel 508 within container 504 (of FIG. 5A), image 510, virtual button 512, and QR code 514.

Specification analyzing component 110 may be configured to determine a creative asset specification that conveys the arrangement of the items of content. The creative asset specification includes one or more of a creative asset type for the creative asset, a value to a creative asset name, parameter values for a set of item parameters for individual ones of the items of content, and other information. The set of item parameters for the individual items of content may include one or more of an item definition, a content type, an item type, an item name, and one or more of sizing, alignment, padding, background, border, action, beacons, and other item parameters. Subsets of parameter values for the item parameters may be compatible with different versions of a streaming video player application. The different versions may correspond to different players that execute the streaming video player application. A player may connect to the Internet and access streaming video offered and delivered by a service provider. The streaming video (content) may include, by way of non-limiting example, one or more of music videos, television shows, movies, short-form clips, video blogs, video podcasts, audio podcasts, sporting events, music events, awards events, competition events, competition shows, and other streaming videos.

The parameter value to the item type may be one or more of a song, a sound effect, a sound clip, a vibration pattern, a resistance, a movement, a temperature, an image, a video, a carousel of images or videos, a quick response (QR) code, text, and user input elements, and other item types. The user input elements may include one or more of a virtual button, a text input box, a dropdown menu, a checkbox, a radio button, and other user input elements.

The item definition may include parameter values to item variants and a visual content mode for the items of content where the parameter value to the content type is the visual content. Parameter values to the item variants may specify one or more of individual uniform record locators for the items of content in the creative asset and identification values that identify the media for the items of content in the electronic storage media 134 or other storage media. The parameter value to the visual content mode may be one of scale to fit, scale aspect fit, scale aspect fill, or other visual content mode.

Responsive to the text being the parameter value to the item type, the parameter values to a text styling and a truncation mode may be hierarchically under the item type.

The creative asset type may include one of a shop, a call-to-action, an information flow, upgrade-lead, advertisement, or other creative asset types. A creative asset of type shop may enable the consumers to purchase one or more products or services. A creative asset of type call-to-action may enable the consumers to complete actions so that other streaming video or other content is accessible or consumed. By way of non-limiting example, the call-to-action may include adding a given streaming video to a list for later consumption, viewing the given streaming video immediately, establishing a reminder to view the given streaming video at a particular time, or other calls-to-action. A creative asset of type of information flow may enable providing information (e.g., an email, a push notification) to the consumers regarding one or more particular products or services conveyed in the creative asset. A creative asset of type upgrade-lead may enable the consumers to obtain addition services or products for services or products they already have access to. It is appreciated that examples described herein may refer to "streaming video", but is not intended to be limiting as other content, such as audio (e.g., music, podcasts), may be contemplated. Individual ones of the consumers may be authenticated into individual accounts with the streaming video player application. The accounts may include one or more of an email, a phone number, a name, payment information, residence information, subscription information, purchase history, play history (e.g., watch, listen), search history, and other account information. Thus, the shop, the call-to-action, the information flow, and the upgrade-lead may be enabled by the accounts of the consumers and the information included thereof.

The value to the creative asset name may be a human-readable identifier that represents the creative asset. In some implementations, the value to the creative asset name may be determined based on one or more of the creative asset type, the items included in the creative asset and the parameter values thereof, and other information. In some implementations, a user may modify the value to the creative asset name via the user interface(s).

The parameter values to the item name may be human-readable identifiers for individual ones of the items of content. The sizing may include width, height, relative, or other sizing parameters. The alignment may include vertical bottom, vertical top vertical center, horizontal leading, horizontal trailing, horizontal center, or other alignment parameters. One parameter value for the padding may indicate a number of pixels for every side of a given item of visual content. Two parameter values for the padding may indicate the number of pixels for a top edge and a bottom edge of the given item of visual content. Three parameter values for the padding may indicate the number of pixels for the top edge, side edges, and the bottom edge of the given item of visual content. The side edges may include a leading edge and a trailing edge. Four parameter values for the padding may indicate the number of pixels for the top edge, the leading edge, the trailing edge, and the bottom edge of the given item of visual content. The background may include one or more of color, opacity, image, and other background parameters. The border may include one or more of border width, color, corner radius, and other border parameters. The actions may include opening a web uniform record locator (URL), a link to a portion of the streaming video player application, a pop-up to obtain user input (e.g., consumer consent), or other actions. The parameter values to the beacons may indicate metrics of consumption by the consumers. The beacons may include one or more of views, duration of the views, clicks, time transpired before the clicks, replays, saves, shares, downloads, and other beacons parameters.

FIG. 3C illustrates a creative asset specification 518 that conveys arrangement 516 of FIG. 5B. Creative asset specification 518 may include a creative asset type 520, a creative asset name 522, and items 524 of which are associated with parameter values for parameters.

Specification analyzing component 110 may be configured to analyze the creative asset specification to verify that the creative asset specification is compliant with a player-compliant schema for encoding the media. The player-compliant schema may define a format by which the creative asset may be defined in compliance. In some implementations, the player-compliant schema may enable the items of the visual content to be in a row layout, a column layout, a z-stack layout, or a carousel layout. The creative asset specification may include parameter values to layout elements that convey the arrangement of the items of visual content. The layout elements may include one or more of a layout type, a layout name, a layout size, a layout alignment, a layout corner radius, a layout border, a layout foreground color, a layout background, a layout padding, a layout spacing, and other layout elements.

In some implementations, analyzing the creative asset specification to verify that the creative asset specification is compliant with the player-compliant schema for encoding media may include verifying the parameter value to the item type for the individual items. In some implementations, analyzing the creative asset specification to verify that the creative asset specification is compliant with the player-compliant schema for encoding media may include determining whether the media (i.e., the image itself, the video itself) conforms to the parameter values for the content type and the item type with which it was assigned at determination of the creative asset specification. In some implementations, analyzing the creative asset specification to verify that the creative asset specification is compliant with the player-compliant schema for encoding media may include verifying the parameter values to the item parameters for the individual items are feasible based on the different versions. In some implementations, analyzing the creative asset specification to verify that the creative asset specification is compliant with the player-compliant schema for encoding media may include determining whether the parameter values to the item variants are accessible from electronic storage media 134 or other electronic storage media via network 122. In some implementations, analyzing the creative asset specification to verify that the creative asset specification is compliant with the player-compliant schema for encoding media may include determining whether the arrangement conveys the items of the visual content in the row layout, the column layout, the z-stack layout, or the carousel layout.

File generating component 112 may be configured to generate a creative asset file that facilitates rendering of the creative asset by the different versions of the streaming video player application for presentation with the streaming video content. The creative asset file may conform to the player-compliant schema. The creative asset file may represent (i) the arrangement of items as a hierarchy of objects in which the creative asset as a whole is represented as an asset object at a highest level of the hierarchy and the individual items included in the creative asset are represented as item objects underneath, (ii) the asset object, or other information. The creative asset file may be based on the creative asset specification and thus represent a finalization of the creative asset specification. The item objects may specify the parameter values for the item parameters from the creative asset. File generating component 112 may be configured to store the creative asset file to electronic storage media 134 or other electronic storage media (e.g., cloud storage communicated with via network 122).

Preview presentation component 114 may be configured to generate multiple renderings of the creative asset from the creative asset file that reflect expected renderings to be generated by the different versions of the streaming video player application. The different versions of the streaming video player application may include a first version, a second version, or other versions. The multiple renderings of the creative asset may include a first rendering that reflects an expected rendering of the creative asset by the first version of the streaming video application and a second rendering that reflects an expected rendering of the creative asset by the second version of the streaming video application.

Preview presentation component 114 may be configured to effectuate presentation of the multiple renderings through a user interface (e.g., the display device) so that the creative asset is preliminarily viewable by the user as it is expected to be rendered by the different versions of the streaming video player application for presentation with streaming video.

Media guide receiving component 116 may be configured to receive a media guide that outlines presentation of the creative assets during a stream of video content through the different versions of the streaming video player application. The media guide may include one or more of (i) temporal markers within a duration of the stream at which the creative assets are permitted for presentation, (ii) reference to one or more of the creative asset files utilized to render one or more of the creative assets, (iii) instructions for selecting one of the one or more objects to be rendered for individual ones of the temporal markers, (iv) playback-updates that cause modifications to the stream responsive to interaction by consumers with individual ones of the items, (v) asset presentation updates that cause modifications to presentation of the creative assets responsive to stream modifications imposed by the consumers, and other information that outlines the presentation of the creative assets.

The temporal marker may specify a playback action to impose on the playback during the presentation of the creative assets. The playback action may include pausing the playback, continue the playback during presentation of individual ones of the creative assets, resume the playback, or other playback actions. The reference to the one or more of the creative asset files may include the creative asset name or other information that facilitate identifying the creative asset files. The stream modifications may include changes to a playback speed, a change in a playback time within the duration, pausing the stream, or other modifications to the stream.

The instructions may be based on at least consumer information, the version of the streaming video player application, or other information. The consumer information may include one or more of stated preferences of content, stated dislikes of content, genres most consumed by the consumer, genres most skipped by the consumer, and other consumer information that characterizes what the consumers like and dislike. The playback-updates may be associated with the individual items. By way of non-limiting example, the playback-updates may cause a delay in the streaming by a particular amount of time.

Media guide implementing component 118 may be configured to determine a version of the streaming video player application that the video content is to be streamed on. Media guide implementing component 118 may be configured to implement the media guide in accordance with the version to cause rendering of the creative assets by utilizing the subsets of the values in the one or more creative asset files that are compatible with the determined version.

Player presentation component 120 may be configured to receive, in an ongoing manner from individual players executing the different versions of the streaming video player application, individual requests for individual creative asset files to cause presentation of the individual corresponding creative assets on the players. The requests may be in accordance with the media guide that outlines presentation of the creative assets during the stream of video content through the different versions of the streaming video player application on the players. Player presentation component 120 may be configured to effectuate, responsive to the individual requests, transmission of the individual creative asset files to the players to enable rendering and presentation of the individual corresponding creative assets on the player.

Figure 6A:
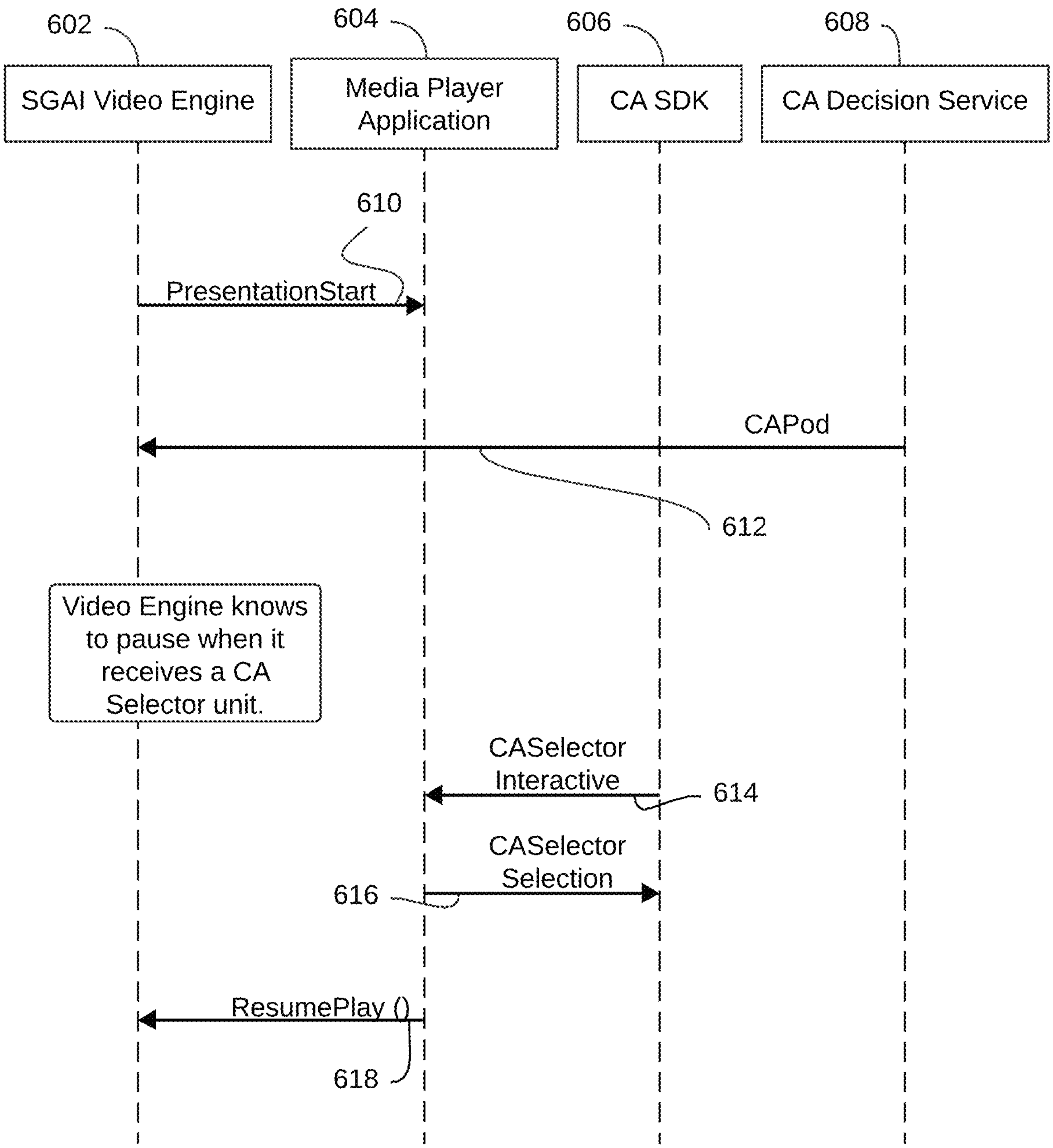
FIGS. 6A-C illustrate exemplary methods for rendering creative assets with creative asset files, in accordance with one or more implementations.
Figure 6B:
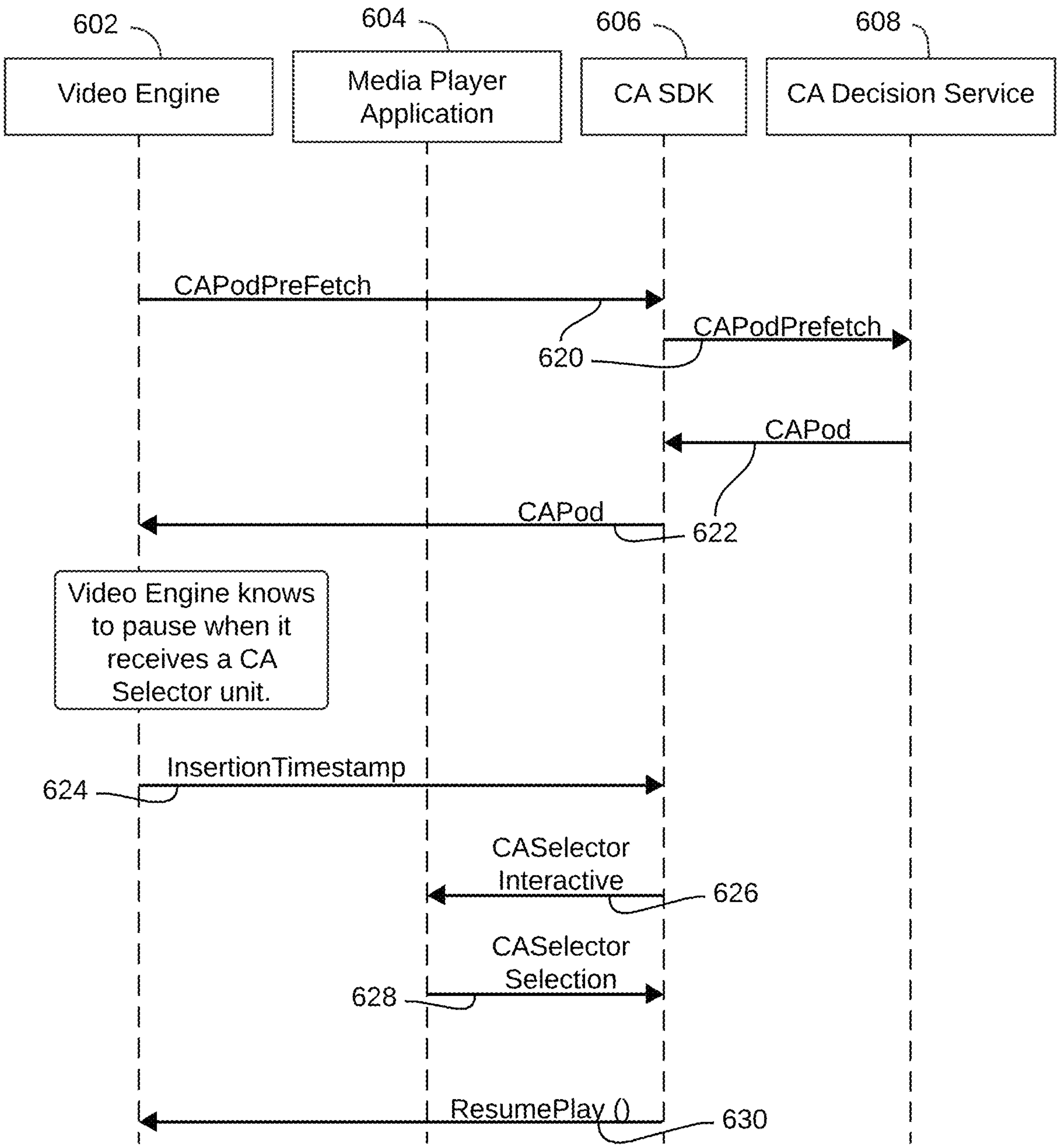
Figure 6C:
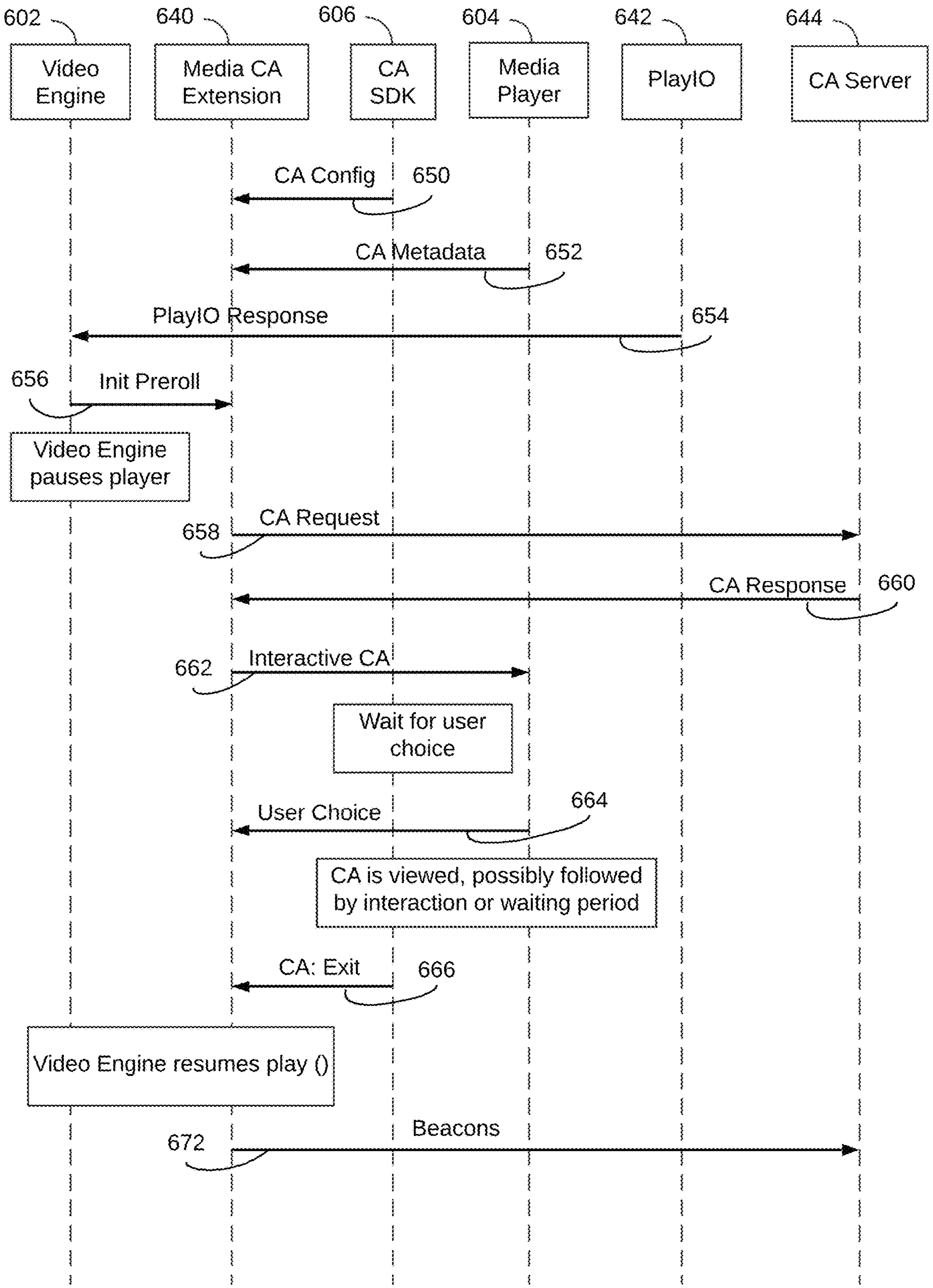

FIG. 6A-C illustrate separate and alternative processes for rendering a creative asset for presentation during streaming of video content. In some implementations, the individual processors may be alternative Referring to FIG. 6A, at operation 610, a video engine 602 may initialize streaming of video content within a media player application 604. In some implementations, video engine 602 may provide the functionality necessary for the video content to be streamed within media player application 604. By way of non-limiting illustration, video engine 602 may decode video formats and files, render video files, and provide other functionality. At operation 612, video engine 602 may receive a creative asset file for a first creative asset ("CAPod") from creative asset (CA) decision service 608 or a creative asset (CA) SDK 606. Video engine 602 may pause the streaming of video content responsive to receipt of a creative asset file, receipt of a creative asset file of a particular type, user input received by media player application 604, or other triggers. FIG. 6A illustrates video engine 602 pausing the streaming of video content responsive to receipt of the first creative asset and the creative asset type for the first creative asset being "Selector," however this is not intended to be limiting.

At operation 614, a rendering of the first creative asset may be generated with the creative asset file and presented within media player application 604. The rendering of the first creative asset with the creative asset file may be generated by CA SDK 606. In some implementations, the rendering of the first creative asset may be presented synchronously with the streaming of video content within media player application 604. The rendering of the first creative asset may be presented such that the creative asset appears to be seamlessly embedded or visually integrated with the video content. In some implementations, CA SDK 606 may generate the rendering of the first creative asset in accordance with one or more of the resolution, orientation, and other playback context of the video content. The first creative asset may be an interactive creative asset such that the rendering of the first creative asset may facilitate user selection of one or more item objects represented by the creative asset file and included in the rendering of the first creative asset. At operation 616, media player application 604 may receive user input indicating selection of one or more of the item objects. At operation 618, the streaming of video content within media player application 604 may resume, responsive to receipt of the user input.

FIG. 6B illustrates an alternative process for rendering a creative asset for presentation during streaming of video content. At operation 620, a video engine 602 may transmit a request for the creative asset file for the first creative asset to CA decision service 608 or CA SDK 606. The request for the creative asset file may be transmitted prior or responsive to initiation of the streaming of video content via media player 604. In some implementations, the request may be transmitted responsive to generation of the video content by video engine 602. In some implementations, the request may be transmitted as part of standardized protocols of video engine 602. In some implementations, the request may be transmitted responsive to user input (e.g., user clicking a "play" button). At operation 622, video engine 602 may receive the creative asset file for the first creative asset from CA decision service 608 or CA SDK 606, responsive to the transmitted request. In some implementations, operation 622 may include receiving a media guide that outlines presentation of one or more creative assets during the stream of video. The media guide may include one or more The media guide may include a temporal marker (i.e., timestamp) within a duration of the video content at which the first creative asset is permitted for presentation. The media guide may further include a reference to the creative asset file for the first creative asset to render the first creative asset. At operation 624, video engine 602 may be configured it identify the temporal marker included in the media guide and generate a rendering of the first creative asset. The rendering of the first creative asset may be presented synchronously with the streaming of video content in accordance with the media guide. In other words, the rendering of the first creative asset may be inserted at the time stamp or duration of the video content indicated by the temporal marker. The presentation of the rendering of the first creative asset may be the same as or similar to the rendering of the first creative asset as detailed in the descriptions of FIG. 6A. At operation 626, the rendering of the first creative asset may be presented within media plater application 604. In some implementations, the rendering of the first creative asset may be presented synchronously with the streaming of video content. At operation 628, media player application 604 may receive user input indicating selection of one or more of the item objects (e.g., interactive elements) represented by the creative asset file and included in the rendering of the first creative asset. At operation 630, the streaming of video content within media player application 604 may resume, responsive to receipt of the user input.

FIG. 6C illustrates an alternative process for rendering a creative asset for presentation during streaming of video content. At operation 650, the media creative asset (CA) extension 640 may be configured to receive device information and a media guide. The media guide may outline presentation of one or more creative assets inserted into the stream of the video content. The media guide may include one or more of (i) temporal markers within a duration of the stream at which the creative assets are permitted for presentation, (ii) reference to one or more of the creative asset files utilized to render one or more of the creative assets, (iii) instructions for selecting one of the one or more objects to be rendered for individual ones of the temporal markers, (iv) playback-updates that cause modifications to the stream responsive to interaction by consumers with individual ones of the items, (v) asset presentation updates that cause modifications to presentation of the creative assets responsive to stream modifications imposed by the consumers, and other information that outlines the presentation of the creative assets. In some implementations, the media guide may be specific to the video content. Device information may include one or more of platform name, device model number, chipset, application name, experiment identifiers and other information associated with a device on which the media player application 604 is executed. At operation 652, media CA extension 640 may be configured to receive application information associated with media player application 604. Application information may include a version of the media player application 604 and other information. At operation 654, video engine 602 may receive playback information from playback input/output ("PlayIO") component 642. The playback information may indicate user input to initiate the stream of the video content. At operation 656, video engine 602 may be configured to initialize the streaming of video content, responsive to receipt of the payback information. Video engine 602 may pause the streaming of the video content responsive to additional playback information received by PlayIO component 642 indicating further user input (e.g., the user selecting a "pause" button). At operation 658, media CA extension 640 may be configured to transmit a creative asset request to a creative asset (CA) server 644 responsive to video engine 602 pausing the streaming of the video content. At operation 660, creative asset (CA) server 644 may transmit a creative asset file for the first creative asset to media CA extension 640, responsive to the creative asset request. At operation 662 a rendering of the first creative asset may be generated by media CA extension 640, inserted into the streaming of the video content, and presented within media player 604. At operation 664, media player application 604 may receive user input indicating selection of one or more of the item objects (e.g., interactive elements) represented by the creative asset file and included in the rendering of the first creative asset. The first creative asset may be presented within media player 604 in accordance with the selection. At operation 666, presentation of the rendering of the first creative asset may be terminated in accordance with the media guide and streaming of the video content may be resumed. At operation 672, beacons may be provided by media CA extension 640 to the CA server 644. The beacons may indicate metrics of consumption by the consumers. The beacons may include views, duration of the views, clicks, time transpired before the clicks, replays, saves, shares, downloads, and other beacons parameters.

Figure 7A:
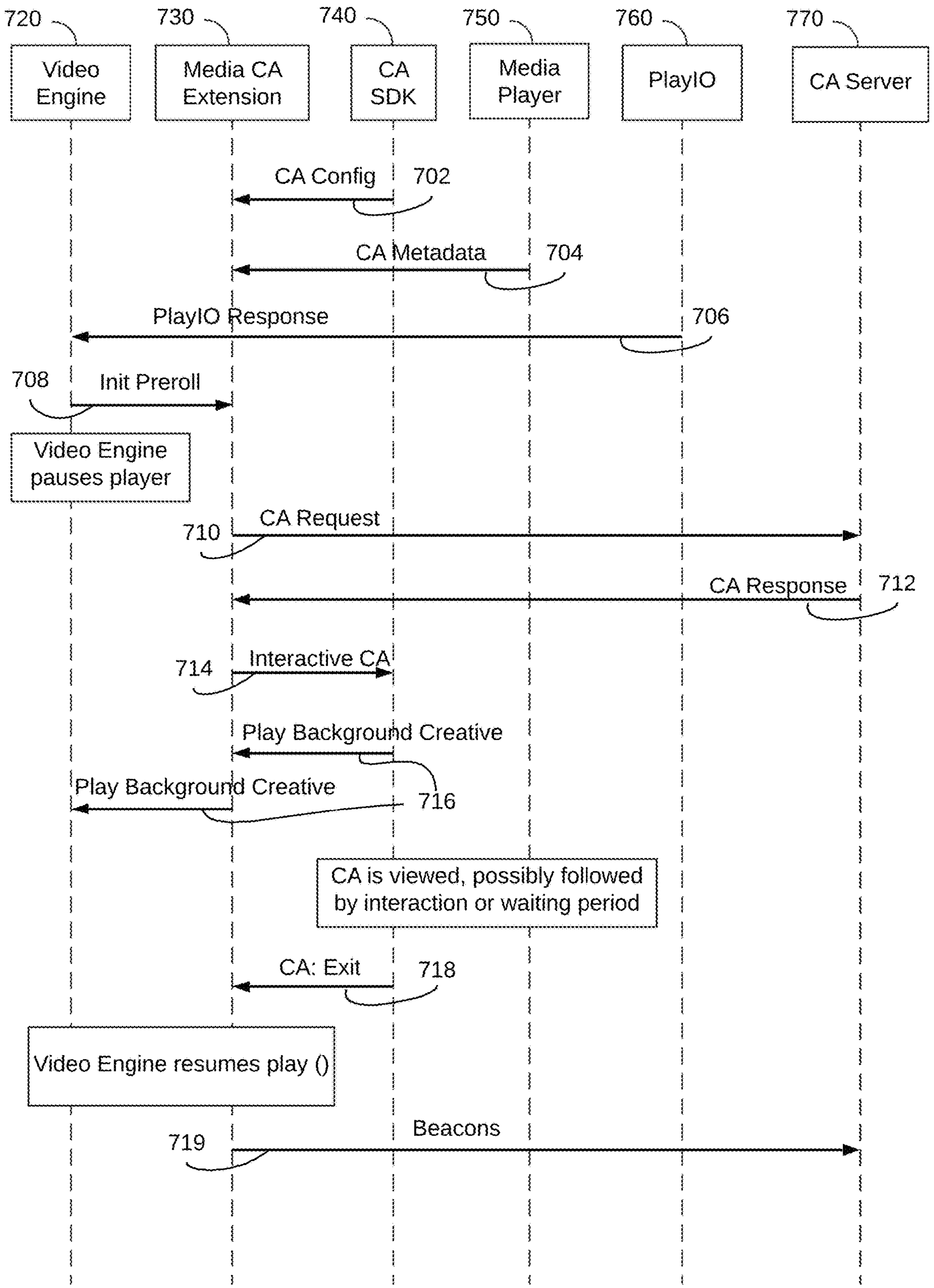
FIGS. 7A-B illustrate exemplary methods for rendering creative assets with creative asset files, in accordance with one or more implementations.
Figure 7B:
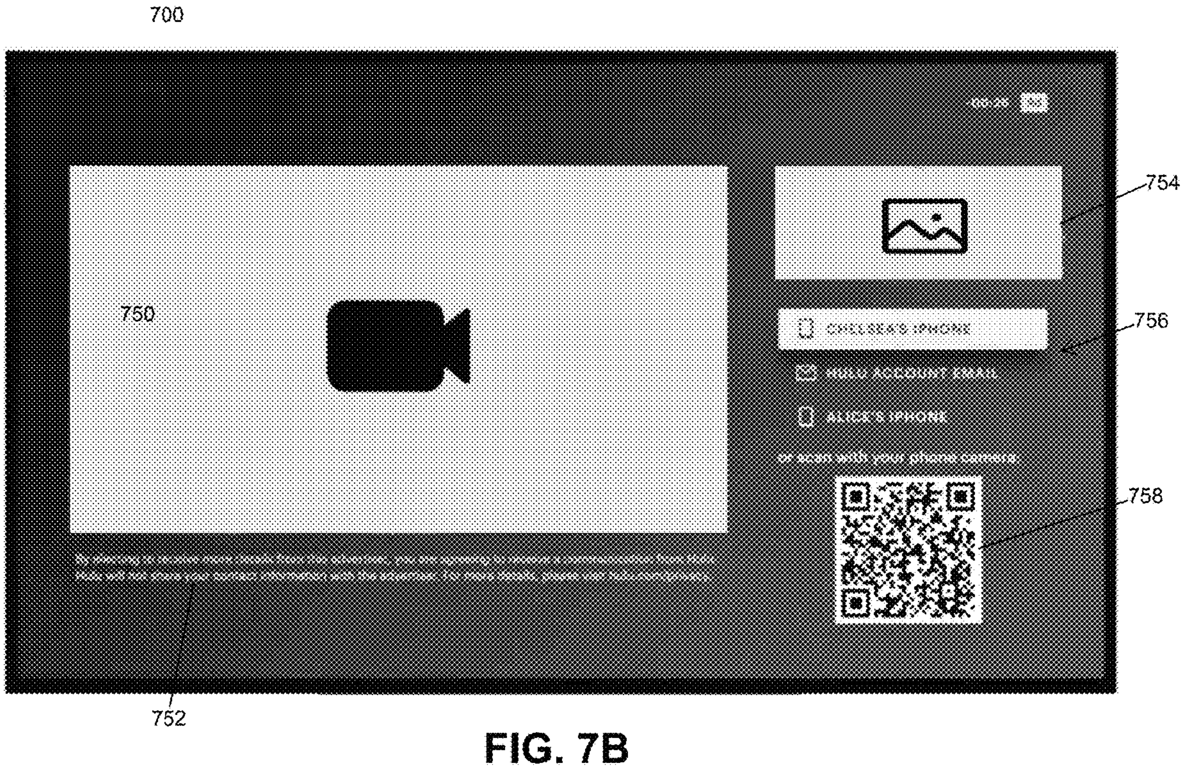

FIG. 7A-B illustrate a process to render a creative asset 700 (of FIG. 7B) for presentation during streaming of video content (not illustrated). Information flow may be the value of the creative asset type for creative asset 700. At operation 702, the media creative asset (CA) extension 730 (which may be the same as or similar to media CA extension 640 of FIGS. 6A-C) may be configured to receive device information. In some implementations, media CA extension 730 may be the same as or similar to media guide implementation component 118 shown in FIG. 1. Device information may include one or more of platform name, device model number, chipset, application name, experiment identifiers and other information associated with a device on which the media player application 750 (which may be the same as or similar to media player application 604 of FIGS. 6A-C) is executed. At operation 704, media CA extension 730 may be configured to receive application information associated with media player application 750. Application information may include a version of the media player application 750 and other information. At operation 706, video engine 720 may receive playback information for the playback session, responsive to a playback ("PlayIO") request 760. Additionally, at operation 706, video engine 720 may receive a media guide that outlined presentation of creative asset 700 during a streaming of video content. At operation 708, video engine 720 may be configured to initialize the streaming of video content. Based on the playback information or the media guide, the streaming of video content may be paused. Additionally, a creative asset file for creative asset 700 may be requested at operation 710, and obtained, at operation 712, from an electronic location 770 (e.g., electronic storage media 134, a creative asset (CA) server). At operation 714 a rendering of creative asset 700 may be generated by media CA extension 730 and presented within media player 750. At operation 714, interactive elements (i.e., virtual buttons 756 and QR code 758 in FIG. 7B) may be presented upon the streaming of the video content pausing. Furthermore, at operation 716, video 750, audio corresponding to the video (not illustrated), text 752, and image 754 in FIG. 7B may be presented synchronous to the interactive elements. At operation 718, creative asset 700 may cease to be presented and, thus, the streaming of the video content may be resumed at operation 718. At operation 719, beacons that characterize the interaction with creative asset 700 by the consumer may be determined and provided to electronic location 730 (e.g., electronic storage media 134 for storage, an ad server for analysis, etc.).

Referring to FIG. 7B, creative asset 700 may include an arrangement of items of content that include a video 750, audio corresponding to the video (not illustrated), text 752, an image 754, virtual buttons 756, and QR code 758 which are presented synchronously. Selection of one of virtual buttons 756 by a consumer may enable the consumer to receive information (e.g., in an email, a push notification) about a product related to and conveyed in video 750, audio corresponding to the video (not illustrated), text 752, and image 754.

Referring to FIG. 1, in some implementations, server(s) 102, client computing platform(s) 104, and external resources 132 may be operatively linked via one or more electronic communication links. For example, such electronic communication links may be established, at least in part, via network 122 such as the Internet or other networks. It will be appreciated that this is not intended to be limiting, and that the scope of this disclosure includes implementations in which server(s) 102, client computing platform(s) 104, and external resources 132 may be operatively linked via some other communication media.

A given client computing platform 104 may include one or more processors configured to execute computer program components. The computer program components may be configured to enable an expert or user associated with the given client computing platform 104 to interface with system 100 and external resources 132, or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a smart watch, an augmented-realty wearable, a virtual-reality wearable, and other computing platforms.

External resources 132 may include sources of information outside of system 100, external entities participating with system 100, or other resources. In some implementations, some or all of the functionality attributed herein to external resources 132 may be provided by resources included in system 100.

Server(s) 102 may include electronic storage 134, one or more processors 136, and other components. Server(s) 102 may include communication lines, or ports to enable the exchange of information with network 122 and other computing platforms. Illustration of server(s) 102 in FIG. 1 is not intended to be limiting. Server(s) 102 may include a plurality of hardware, software, and firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and other electronically readable storage media. Electronic storage 134 may include one or more virtual storage resources (e.g., cloud storage, a virtual private network, or other virtual storage resources). Electronic storage 134 may store software algorithms, information determined by processor(s) 136, information received from server(s) 102, information received from client computing platform(s) 104, and other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108, 110, 112, 114, 116, 118, and 120, or other components. Processor(s) 136 may be configured to execute components 108, 110, 112, 114, 116, 118, and 120, or other components by software; hardware; firmware; some combination of software, hardware, and firmware; or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and 120 are illustrated in FIG. 1 as being implemented within a single processing unit, in implementations in which processor(s) 136 includes multiple processing units, one or more of components 108, 110, 112, 114, 116, 118, and 120 may be implemented remotely from the other components. The description of the functionality provided by the different components 108, 110, 112, 114, 116, 118, and 120 described below is for illustrative purposes, and is not intended to be limiting, as any of components 108, 110, 112, 114, 116, 118, and 120 may provide more or less functionality than is described. For example, one or more of components 108, 110, 112, 114, 116, 118, and 120 may be eliminated, and some or all of its functionality may be provided by other ones of components 108, 110, 112, 114, 116, 118, and 120. As another example, processor(s) 136 may be configured to execute one or more additional components that may perform some or all of the functionality attributed below to one of components 108, 110, 112, 114, 116, 118, and 120.

Figure 2:
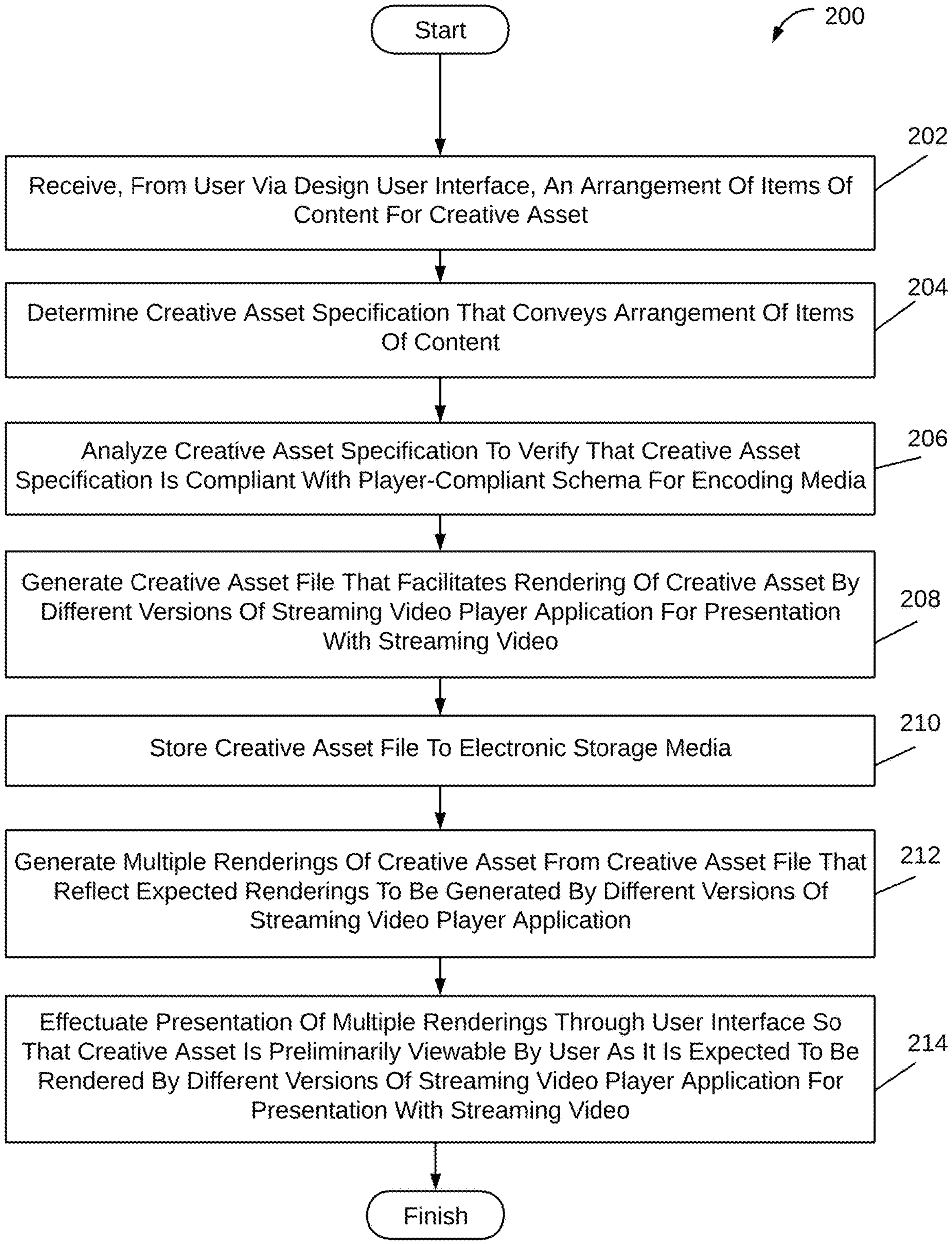
FIG. 2 illustrates a method for generating creative asset files for rendering creative assets with streaming video content through different versions of a streaming video play application, in accordance with one or more implementations

FIG. 2 illustrates a method 200 to encode media into player-compliant files for presentation with streaming video content through different versions of a streaming video player application, in accordance with one or more implementations. The operations of method 200 presented below are intended to be illustrative. In some implementations, method 200 may be accomplished with one or more additional operations not described, or without one or more of the operations discussed. Additionally, the order in which the operations of method 200 are illustrated in FIG. 2 and described below is not intended to be limiting.

An operation 202 may include receiving, from a user via a design user interface, an arrangement of items of content for a creative asset. The creative asset may be media for presentation with streaming video. Operation 202 may be performed by one or more hardware processors configured by machine-readable instructions including a component that is the same as or similar to specification determining component 108, in accordance with one or more implementations.

An operation 204 may include determining a creative asset specification that conveys the arrangement of the items of content. Operation 204 may be performed by one or more hardware processors configured by machine-readable instructions including a component that is the same as or similar to specification determining component 108, in accordance with one or more implementations.

An operation 206 may include analyzing the creative asset specification to verify that the creative asset specification is compliant with a player-compliant schema for encoding media. Operation 206 may be performed by one or more hardware processors configured by machine-readable instructions including a component that is the same as or similar to specification determining component 110, in accordance with one or more implementations.

An operation 208 may include generating a creative asset file that facilitates rendering of the creative asset by the different versions of the streaming video player application for presentation with streaming video. Operation 208 may be performed by one or more hardware processors configured by machine-readable instructions including a component that is the same as or similar to file generating component 112, in accordance with one or more implementations.

An operation 210 may include storing the creative asset file to electronic storage media. Operation 210 may be performed by one or more hardware processors configured by machine-readable instructions including a component that is the same as or similar to file generating component 112, in accordance with one or more implementations.

An operation 212 may include generating multiple renderings of the creative asset from the creative asset file that reflect expected renderings to be generated by the different versions of the streaming video player application. Operation 212 may be performed by one or more hardware processors configured by machine-readable instructions including a component that is the same as or similar to preview presentation component 114, in accordance with one or more implementations.

An operation 214 may include effectuating presentation of the multiple renderings through a user interface so that the creative asset is preliminarily viewable by the user as it is expected to be rendered by the different versions of the streaming video player application for presentation with streaming video. Operation 214 may be performed by one or more hardware processors configured by machine-readable instructions including a component that is the same as or similar to preview presentation component 114, in accordance with one or more implementations.

Figure 3:
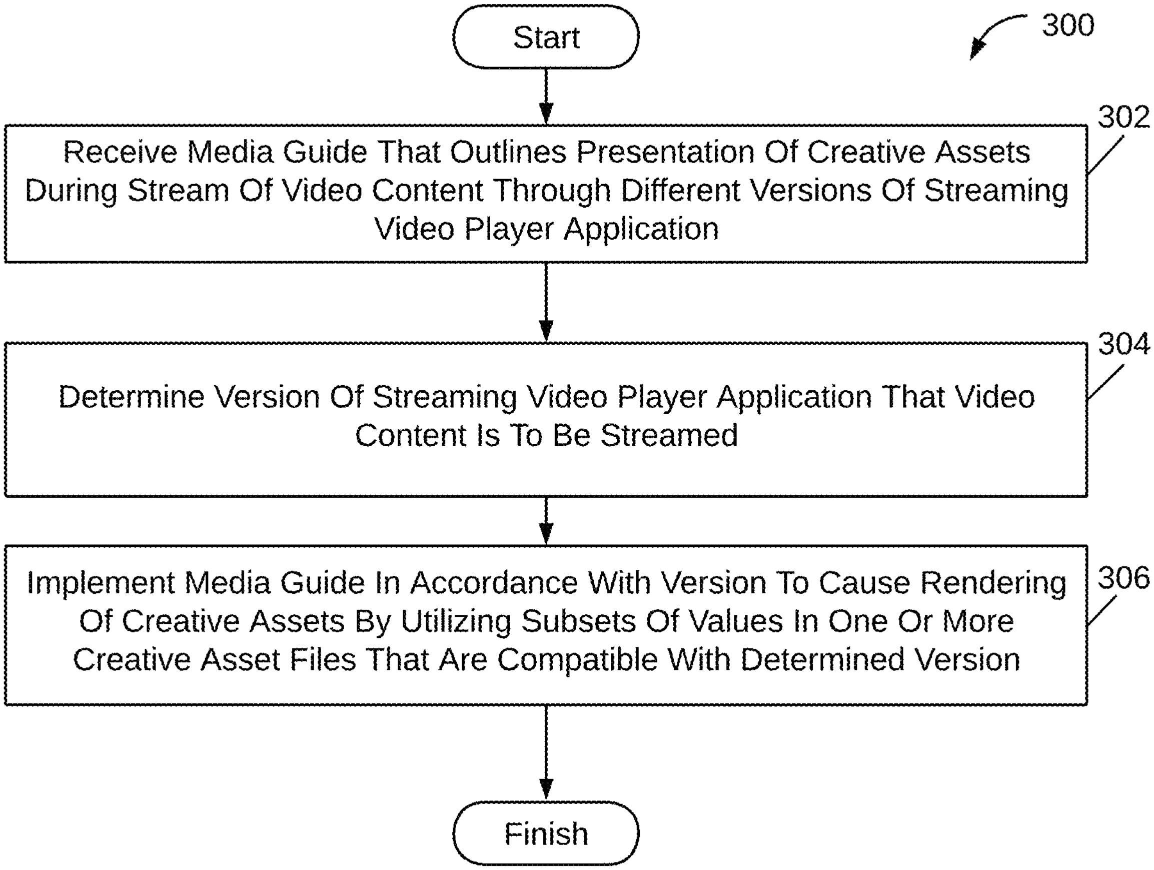
FIG. 3 illustrates a method for rendering creative assets for presentation during streaming of video content, in accordance with one or more implementations.

FIG. 3 illustrates a method 300 to render creative assets for presentation during streaming of video content, in accordance with one or more implementations. The operations of method 300 presented below are intended to be illustrative. In some implementations, method 300 may be accomplished with one or more additional operations not described, or without one or more of the operations discussed. Additionally, the order in which the operations of method 300 are illustrated in FIG. 3 and described below is not intended to be limiting.

An operation 302 may include receiving a media guide that outlines presentation of the creative assets during a stream of video content through different versions of a streaming video player application. Operation 302 may be performed by one or more hardware processors configured by machine-readable instructions including a component that is the same as or similar to media guide receiving component 116, in accordance with one or more implementations.

An operation 304 may include determining a version of the streaming video player application that the video content is to be streamed. Operation 304 may be performed by one or more hardware processors configured by machine-readable instructions including a component that is the same as or similar to media guide implementing component 118, in accordance with one or more implementations.

An operation 306 may include implementing the media guide in accordance with the version to cause rendering of the creative assets by utilizing the subsets of the values in the one or more creative asset files that are compatible with the determined version. Operation 306 may be performed by one or more hardware processors configured by machine-readable instructions including a component that is the same as or similar to media guide implementing component 118, in accordance with one or more implementations.

Figure 4:
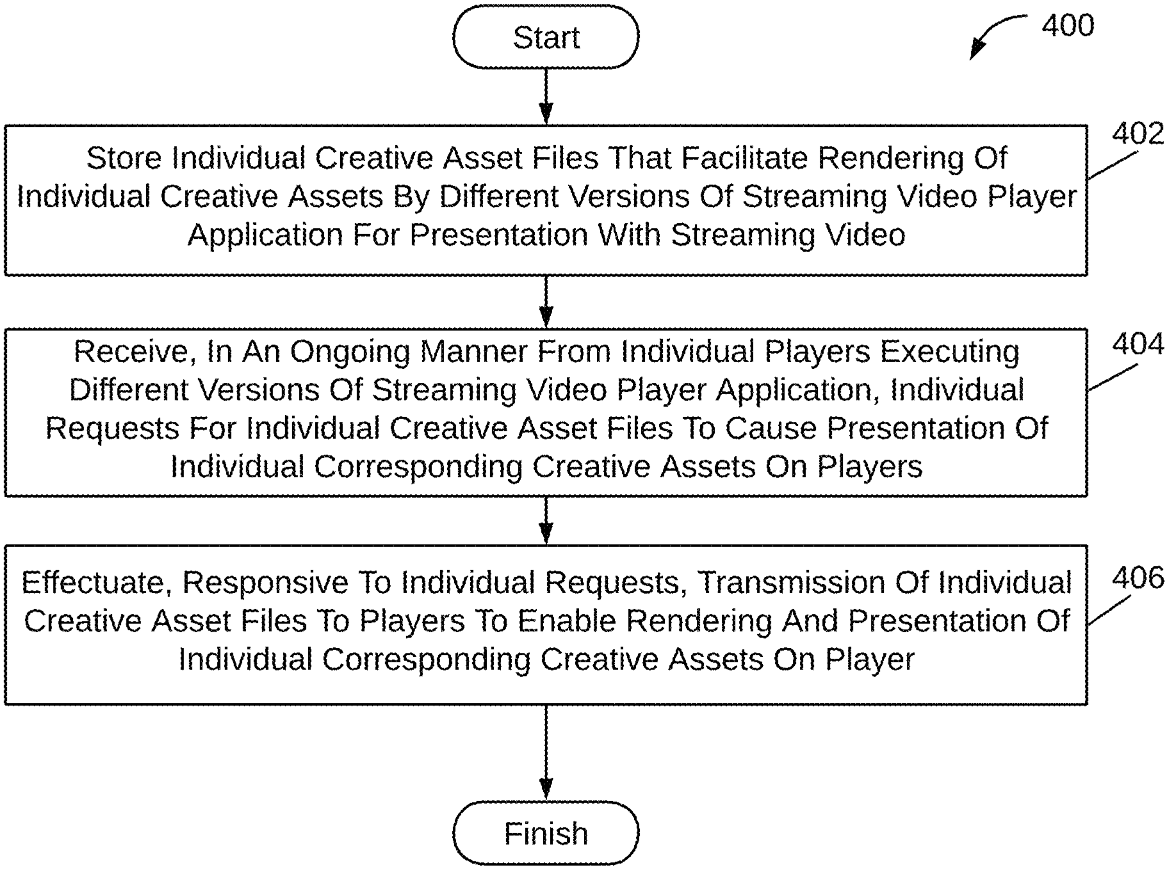
FIG. 4 illustrates a method for facilitating the rendering and presentation of creative assets by different versions of a streaming video player application, in accordance with one or more implementations.

FIG. 4 illustrates a method 400 to define a creative asset in accordance with a player-compliant schema, in accordance with one or more implementations. The operations of method 400 presented below are intended to be illustrative. In some implementations, method 400 may be accomplished with one or more additional operations not described, or without one or more of the operations discussed. Additionally, the order in which the operations of method 400 are illustrated in FIG. 4 and described below is not intended to be limiting.

An operation 402 may include storing individual creative asset files that facilitate rendering of individual creative assets by different versions of the streaming video player application for presentation with streaming video. Operation 402 may be performed by one or more hardware processors configured by machine-readable instructions including a component that is the same as or similar to file generating component 112, in accordance with one or more implementations.

An operation 404 may include receiving, in an ongoing manner from individual players executing the different versions of the streaming video player application, individual requests for individual creative asset files to cause presentation of the individual corresponding creative assets on the players. Operation 404 may be performed by one or more hardware processors configured by machine-readable instructions including a component that is the same as or similar to player presentation component 120, in accordance with one or more implementations.

An operation 406 may include effectuating, responsive to the individual requests, transmission of the individual creative asset files to the players to enable rendering and presentation of the individual corresponding creative assets on the player. Operation 406 may be performed by one or more hardware processors configured by machine-readable instructions including a component that is the same as or similar to player presentation component 120, in accordance with one or more implementations.

In some implementations, methods 200, 300, and 400 in FIGS. 2-4, respectively, may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of methods 200, 300, and 400 in response to instructions stored electronically on an electronic storage medium. The one or more processing devices may include one or more devices configured through hardware, firmware, and software to be specifically designed for execution of one or more of the operations of methods 200, 300, and 400.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate creative asset files for rendering creative assets with streaming video content through different versions of a streaming video player application, the system comprising:

one or more processors configured by machine-readable instructions to:

receive, from a user via a design user interface, an arrangement of items of content for a creative asset, wherein the creative asset is media for presentation with streaming video;

determine a creative asset specification that conveys the arrangement of the items of content, wherein the creative asset specification includes at least:

a creative asset type for the creative asset, and, for individual ones of the items of content, parameter values for a set of item parameters, and wherein subsets of the parameter values for the item parameters are compatible with different versions of a streaming video player application;

analyze the creative asset specification to verify that the creative asset specification is compliant with a player-compliant schema for encoding media;

generate a creative asset file that facilitates rendering of the creative asset by the different versions of the streaming video player application for presentation with streaming video, wherein the creative asset file conforms to the player-compliant schema for encoding media, wherein the creative asset file represents (i) the arrangement of the items of content as a hierarchy of objects in which the creative asset as a whole is represented as an asset object at a highest level of the hierarchy and the individual ones of the items of content included in the creative asset are represented as item objects underneath and (ii) the asset object, wherein the item objects specify the parameter values for the item parameters from the creative asset;

store the creative asset file to electronic storage media;

generate multiple renderings of the creative asset from the creative asset file that reflect expected renderings to be generated by the different versions of the streaming video player application, wherein the different versions of the streaming video player application include a first version and a second version, and the multiple renderings of the creative asset include a first rendering that reflects an expected rendering of the creative asset by the first version of the streaming video player application and a second rendering that reflects an expected rendering of the creative asset by the second version of the streaming video player application; and effectuate presentation of the multiple renderings through the design user interface so that the creative asset is preliminarily viewable by the user as it is expected to be rendered by the different versions of the streaming video player application for presentation with the streaming video.

2. The system of claim 1, wherein the set of the item parameters for the individual one of the items of content includes an item definition, a content type, an item type, an item name, and one or more of sizing, alignment, padding, background, border, action, or beacons.

3. The system of claim 2, wherein a parameter value to the content type for the individual ones of the items of content is one of audio content, haptic content, olfactory content, and visual content.

4. The system of claim 2, wherein a parameter value to the item type is one of a song, a sound effect, a sound clip, a vibration pattern, a resistance, a movement, a temperature, an image, a video, a carousel of images or videos, text, and user input elements, wherein the user input elements include a virtual button, a text input box, a dropdown menu, a checkbox, or a radio button.

5. The system of claim 2, wherein the item definition includes the parameter values for item variants and a visual content mode for the items of content where a parameter value to the content type is the visual content, wherein the parameter values for the item variants specify individual uniform resource locators for the items of content in the creative asset or identification values that identify the media for the items of content in the electronic storage media, and wherein a parameter value to the visual content mode is one of scale to fit, scale aspect fit, and scale aspect fill.

6. The system of claim 2, wherein analyzing the creative asset specification to verify that the creative asset specification is compliant with the player-compliant schema for encoding media includes verifying the parameter value to the item type for the items of content.

7. The system of claim 2, wherein analyzing the creative asset specification to verify that the creative asset specification is compliant with the player-compliant schema for encoding media includes determining whether the media conforms to the parameter values for the content type and the item type with which it was assigned at determination of the creative asset specification.

8. The system of claim 5, wherein analyzing the creative asset specification to verify that the creative asset specification is compliant with the player-compliant schema for encoding media includes determining whether the parameter values for the item variants are accessible.

9. The system of claim 1, wherein the player-compliant schema for encoding media enables the items of content to be in a row layout, a column layout, a z-stack layout, or a carousel layout, wherein the creative asset specification includes parameter values to layout elements that convey the arrangement of the items of content, wherein the layout elements include a layout type, a layout name, a layout size, a layout alignment, a layout corner radius, a layout border, a layout foreground color, a layout background, a layout padding, or a layout spacing.

10. The system of claim 9, wherein analyzing the creative asset specification to verify that the creative asset specification is compliant with the player-compliant schema for encoding media includes determining whether the arrangement conveys the items of content in the row layout, the column layout, the z-stack layout, or the carousel layout.

11. A system configured to implement media guides in accordance with different versions of a streaming video player application for rendering creative assets for presentation during streaming of video content, the system comprising:

electronic storage that stores individual creative asset files that facilitate rendering of individual creative assets by different versions of the streaming video player application for presentation with streaming video, wherein the creative asset files conform to a player-compliant schema, wherein a creative asset file represents (i) an arrangement of items of content as a hierarchy of objects in which a creative asset as a whole is represented as an asset object at a highest level of the hierarchy and the individual ones of the items of content included in the creative asset are represented as item objects underneath and (ii) the asset object, wherein the item objects specify parameter values for item parameters from the creative asset; and one or more processors configured by machine-readable instructions to:

receive a media guide that outlines presentation of the creative assets during a stream of video content through the different versions of the streaming video player application, wherein the media guide includes:

(i) temporal markers within a duration of the stream at which the creative assets are permitted for presentation, (ii) reference to one or more of the creative asset files utilized to render one or more of the creative assets, (iii) instructions for selecting one of the objects to be rendered for individual ones of the temporal markers, wherein the instructions are based on at least consumer information and the streaming video player application, (iv) playback-updates that cause modifications to the stream responsive to interaction by consumers with individual ones of the items, wherein the playback-updates are associated with the individual items, and (v) asset presentation updates that cause modifications to presentation of the creative assets responsive to stream modifications imposed by the consumers;

determine a version of the streaming video player application that the video content is to be streamed on; and implement the media guide in accordance with the version to cause rendering of the creative assets by utilizing subsets of the parameter values in the one or more of the creative asset files that are compatible with the version.

12. The system of claim 11, wherein a temporal marker specifies a playback action to impose on the playback during the presentation of the creative assets.

13. The system of claim 12, wherein the playback action includes pausing the playback, continuing the playback during presentation of individual ones of the creative assets, or resuming the playback.

14. The system of claim 11, wherein the stream modifications include a change to a playback speed, a change in a playback time within the duration, or a pause of the stream.

15. A system configured to render presentations of creative assets within streams of video content through different versions of a streaming video player using creative asset files that conform to player-compliant schemas, the system comprising:

one or more processors configured by machine-readable instructions to:

store individual creative asset files that facilitate rendering of individual creative assets by different versions of a streaming video player application for presentation with streaming video, wherein the creative asset files conform to a player-compliant schema, wherein a creative asset file represents (i) an arrangement of items of content as a hierarchy of objects in which a creative asset as a whole is represented as an asset object at a highest level of the hierarchy and individual ones of the items of content included in the creative asset are represented as item objects underneath, and (ii) the asset object, wherein the item objects specify parameter values for item parameters from the creative asset;

receive, in an ongoing manner from individual players executing the different versions of the streaming video player application, individual requests for the individual ones of the creative asset files to cause presentation of the individual corresponding creative assets on the players, wherein the requests are in accordance with a media guide that outlines presentation of the creative assets during a stream of video content through the different versions of the streaming video player application on the players; and effectuate, responsive to the individual ones of the requests, transmission of the individual ones of the creative asset files to the players to enable rendering and presentation of the corresponding one of the creative assets on the players.

16. The system of claim 15, wherein the item parameters include sizing and wherein the sizing includes width, height, and relative.

17. The system of claim 15, wherein the item parameters include alignment and wherein the alignment includes vertical bottom, vertical top, vertical center, horizontal leading, horizontal trailing, and horizontal center.

18. The system of claim 15, wherein one parameter value for a padding indicates a number of pixels for every side of a given item of content.

19. The system of claim 18, wherein two parameter values for the padding indicate the number of pixels for a top edge and a bottom edge of the given item of content, wherein three parameter values for the padding indicate the number of pixels for the top edge, side edges, and the bottom edge of the given item of content, wherein the side edges include a leading edge and a trailing edge, and wherein four parameter values for the padding indicate the number of pixels for the top edge, the leading edge, the trailing edge, and the bottom edge of the given item of content.

20. The system of claim 15, wherein a background includes color, opacity, and image.

* * * * *